(12) United States Patent
Raisch

(10) Patent No.: US 9,389,739 B2
(45) Date of Patent: Jul. 12, 2016

(54) METHODS AND DEVICES FOR TRANSFERRING A TACTILE SIGNAL THROUGH A SOLID ELEMENT

(71) Applicant: Netanel Raisch, Psagot (IL)

(72) Inventor: Netanel Raisch, Psagot (IL)

( * ) Notice: Subject to any disclaimer, the term of this patent is extended or adjusted under 35 U.S.C. 154(b) by 153 days.

(21) Appl. No.: 14/166,873

(22) Filed: Jan. 29, 2014

(65) Prior Publication Data

US 2015/0212603 A1    Jul. 30, 2015

(51) Int. Cl.
*G06F 3/045*        (2006.01)
*G06F 3/041*        (2006.01)
*G06F 3/044*        (2006.01)

(52) U.S. Cl.
CPC ............... *G06F 3/044* (2013.01); *G06F 3/041* (2013.01)

(58) Field of Classification Search
CPC ....... G06F 3/016; G06F 3/0488; G06F 3/041; G06F 3/0416
See application file for complete search history.

(56) References Cited

U.S. PATENT DOCUMENTS

| | | | | |
|---|---|---|---|---|
| 2004/0028429 A1* | 2/2004 | Matsumaru | ................... | 399/276 |
| 2004/0178996 A1* | 9/2004 | Kurashima et al. | ........... | 345/173 |
| 2009/0315690 A1* | 12/2009 | Hwang et al. | .............. | 340/407.2 |
| 2010/0265212 A1* | 10/2010 | Sekiguchi et al. | ............ | 345/174 |
| 2011/0169775 A1* | 7/2011 | Liaw et al. | .................... | 345/175 |

* cited by examiner

*Primary Examiner* — Alexander Eisen
*Assistant Examiner* — Nan-Ying Yang

(57) ABSTRACT

The invention discloses devices and methods for transferring a tactile signal through an inert piece of material. In some embodiments, clear, impact resistant covers are employed with devices including touch-sensitive screens. The instant invention, in some embodiments, employs a plurality of magnets to allow one to input information on a touch-sensitive screen through the inert cover. Contact of a magnet pair above the cover may allow for a signal to be delivered to the touch-sensitive display via a second magnet pair that includes a stylus adapted to activate the surface of the display.

16 Claims, 17 Drawing Sheets

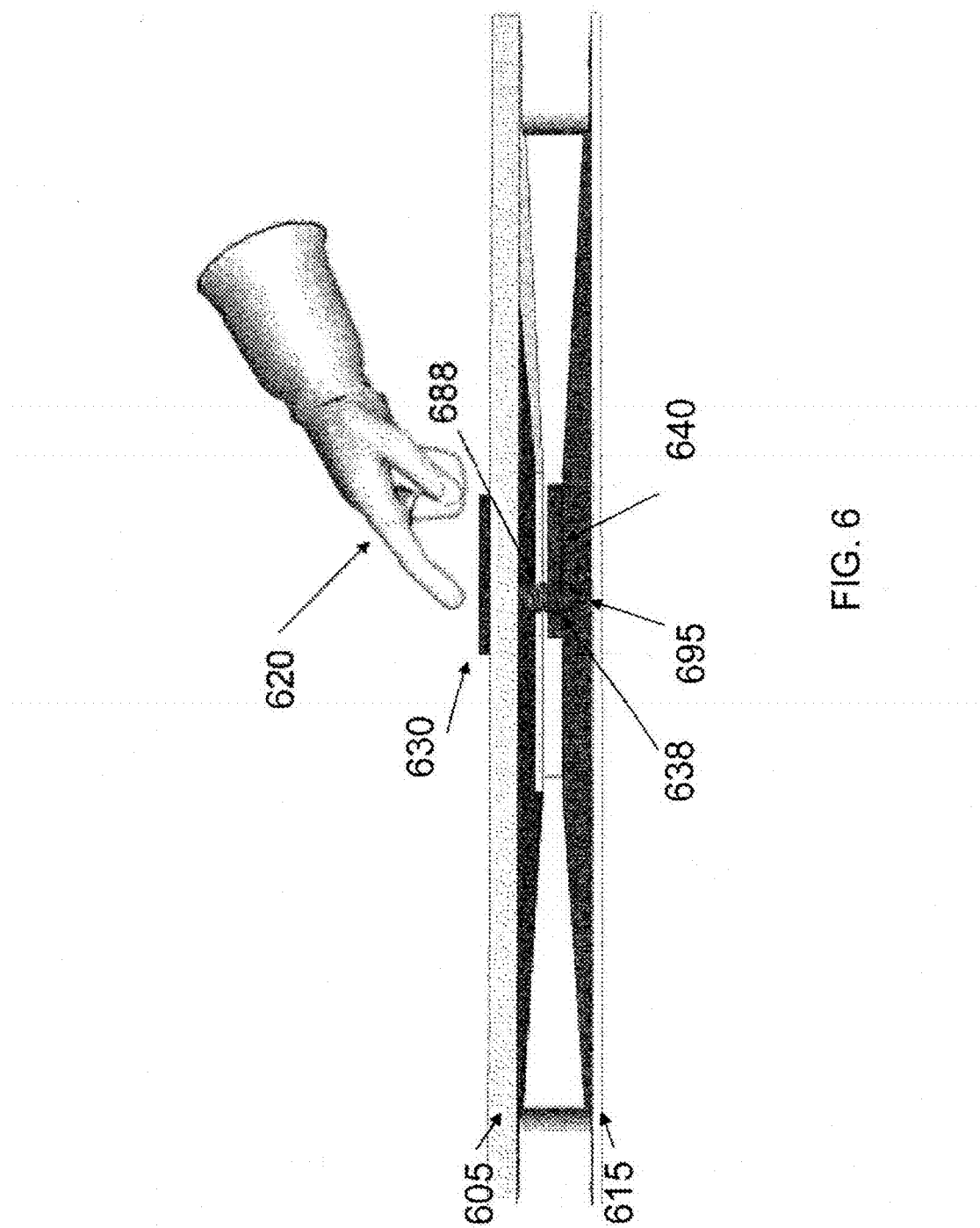

providing an optically clear solid element whose dimensions are similar to those of the display and whose thickness is selected to prevent damage to the display

disposing magnet pairs on either side of the solid element, wherein the magnet pairs are disposed opposite one another and wherein physical contact with one magnet of a first magnet pair causes magnetic repulsion of a first magnet opposite it in the second magnet pair on the other side of the solid element

associating a stylus to the first magnet of the second magnet pair, wherein the stylus is disposed away from the solid element

securing the solid element with the magnets and stylus onto the display, wherein the stylus is in non-contact proximity to the display

FIG. 7

METHODS AND DEVICES FOR TRANSFERRING A TACTILE SIGNAL THROUGH A SOLID ELEMENT

The present invention, in some embodiments thereof, relates to methods and devices for allowing the transfer of a tactile signal through a solid, non-conducting surface. The instant invention, in some embodiments, allows for a user to access a touch-screen display through a rigid, otherwise electrically unresponsive cover. The instant application is a continuation-in-part of U.S. patent application Ser. No. 13/622,274 of identical inventorship.

FIELD AND BACKGROUND OF THE INVENTION

One of the greatest revolutions in the electronics sphere has been devices with touch-sensitive displays. "Smart" phones, tablet computers, GPS devices and other advanced devices allow for a touch-based interface between a user and the device. A typical smart phone allows one to access Internet, email, phone, pictures, music, applications, and a host of other features through finger-based actions on a touch-sensitive screen.

One of the challenges of touch-sensitive screens has been their relative fragility. A veritable cottage industry exists for replacing and fixing cracked screens associated with phones and tablet computers. While very solid and sophisticated cases exist for the body of modern portable computerized devices with touch screens ("computerized devices"), the touch-sensitive screen generally remains available or is only nominally covered so as to allow user access for answering and making calls and otherwise accessing the device's wide functionality. Annual losses due to cracked or broken touch screens on smartphones are over $1B. Placing a thick solid piece over the touch-sensitive area would make the phone unusable until the solid piece was removed for display access.

The current state of affairs leaves a user with a choice. If the screen is covered with a thick cover, then the display is safe from damage but the computerized devices are for all purposes unusable. If the screen is available for user access, then the risk exists for damage to the screen from falls, impacts, children misuse or other accidents. As of today, there is little way to both protect a touch-sensitive (glass, generally) screen and still allow for unfettered access to the wide range of smart device functions enumerated above.

U.S. Pat. No. 8,044,942 to Leonard, et al teaches a touch screen protector for a hand held electronic device having a front face that includes a touch screen portion and an outer perimeter. The touch screen protector of the invention comprises a plastic film having front and back sides, an outer perimeter that corresponds to that of the device, and a transparent window; and a spacer provided along the outer perimeter of the plastic film surrounding the transparent window, having a thickness sufficient to space the plastic film near but not in contact with the touch screen portion, and an exposed adhesive for removably mounting the protector upon the outer perimeter of the front face to form an enclosed air space between the transparent window of the plastic film, the spacer and the touch screen portion of the device.

U.S. patent application Ser. No. 12/977,919 to Karpfinger describes a user-configurable, tactile interface system that includes mechanical buttons with several mounting options, and several methods to interface with touch-sensing devices. A user can activate a touch on a touch sensing device by pressing a physical pad, which may be textured, or raised.

U.S. Pat. No. 7,495,895 to Carnevali. Describes a protective cover for a device having a touch-sensitive screen, the cover being a substantially optically transparent flexible protective cover formed of a unitary combination of a mask portion substantially surrounded with a plurality of integrally interconnected curtain portions extending therefrom and forming therebetween a plurality of interconnected lip portions, the mask, curtain and lip portions forming a cavity therebetween with the lip portions surrounding a mouth opening thereinto; and the mask portion further having a relatively thicker frame portion surrounding a relatively thinner recessed integral window portion formed of a flexible membrane that is positioned over the device's touch screen.

U.S. patent application Ser. No. 12/949,177 to Park, teaches an LCD screen protector for LCD devices, which is made of thin, tempered glass or reinforced plastics with great strength, strongly adhered on the surface of an LCD device to protect the LCD device from external shocks. The LCD screen protector includes a protective plate made of tempered glass or reinforced plastics with good anti-bendability and a ring-shaped band with elasticity protrudingly formed on an outer circumference of the protective plate.

U.S. Pat. No. 6,152,550 to Yamaguchi describes a protective sheet mount structure for a display which may be employed in electronic cash registers. The structure includes a frame mount formed on a frame of a display around an opening through which a display screen is exposed, a protective sheet covering the display screen, and a sheet mount frame fitted in the frame mount detachably to retain the protective sheet on the frame of the display.

U.S. Pat. No. 6,660,389 to Junkang teaches information display protectors for display devices having an information display area, comprising a stack of flexible substantially transparent sheets, the sheets having on one side thereof an adhesive layer and having on the other side thereof a hardcoat layer comprising inorganic oxide particles dispersed in a binder matrix and a low surface energy fluorinated compound, the stack being cut so that the sheets will fit the information display area. The low surface energy fluorinated compound can be part of the hardcoat layer or can be a separate layer atop the hardcoat layer. The protectors have very good scratch, smudge and glare resistance. The stack of protectors can be stored, for example, on a personal digital assistant or its cover or case.

The prior art generally describes display covers that offer display access but no serious display protection from falls, impacts and other potential damage.

SUMMARY OF THE INVENTION

It is therefore a purpose of the present invention, in some embodiments, to describe methods and devices for allowing a user to make full use of a touch-screen display through an impact-resistant cover.

The invention includes a device for allowing transmission of a tactile signal through a rigid material, including: a rigid, generally flat element; a first magnet pair disposed on an outer side of the element, wherein the magnets of the first magnet pair are of positive and negative polarity facing the outer side of the element and the magnet with positive polarity is disposed slightly above the element; and, a second magnet pair disposed on a inner side of the element physically opposite the first magnet pair, wherein the magnets of the second magnet pair are of positive polarity facing the inner side of the element.

In one aspect of the device, the first magnet pair and the second magnet pair are free to move over the area of the element.

In another aspect of the device, the first magnet pair is realized as an electromagnet.

In another aspect of the device, the second magnet pair is realized as an electromagnet.

In another aspect of the device, one magnet of the magnet pairs is an electromagnet.

In another aspect of the device, the first magnet pair has a place for easy positioning of a user's finger.

In another aspect of the device, the element is optically clear.

In another aspect of the device, the magnets of the first magnet pair are attached to each other with a non-conducting material.

In another aspect of the device, the magnets of the second magnet pair are attached to each other with a non-conducting material.

In another aspect of the device, the device is used as a protective cover for a touch-sensitive screen.

In another aspect of the device, the touch-sensitive screen is associated with a cellular phone, tablet computer, computer screen, watch or handheld computing device.

In another aspect of the device, the element has a clip or contact elements associated with the second side to assist in association of the device with the touch-sensitive screen.

In another aspect of the device, there is additionally a stylus associated with a magnet of the second magnet pair, wherein the stylus sits on a side of the first magnet away from the element and is adapted to activate a region of the touch-sensitive screen when in contact with the screen.

In another aspect of the device, physical contact with the positive polarity magnet of the first magnet pair causes the stylus to contact the screen.

In another aspect of the device, the element is realized from clear plastic, glass, Plexiglass, or composite material.

In another aspect of the device, there is additionally an anti-friction coating to ease magnet movement over the surfaces of the element.

The invention additionally includes a device for protecting a touch-sensitive display screen, including: a generally flat element of a predetermined thickness; a first magnet pair disposed on an outer side of the element, wherein the magnets of the first magnet pair are of positive and negative polarity facing the outer side of the element and the magnet with positive polarity is disposed slightly above the element; a second magnet pair disposed on a inner side of the element physically opposite the first magnet pair, wherein the magnets of the second magnet pair are of positive polarity facing the inner side of the element; and, a stylus for activating the display screen, the stylus being associated with one of the magnets of the second magnet pair.

In one aspect of the device, the touch-sensitive display is associated with a cellular phone, tablet computer, computer screen or handheld computing device.

In another aspect of the device, there is additionally an anti-friction coating associated with the magnetic elements.

In another aspect of the device, there are additional magnet pairs.

In another aspect of the device, the magnetic elements are selected for size, material and appearance so as to allow for easy viewing of the display screen.

The invention includes a method for protecting a touch-screen display from physical damage, including: providing an optically clear solid element whose dimensions are similar to those of the display and whose thickness is selected to prevent damage to the display; disposing magnet pairs on either side of the solid element, wherein the magnet pairs are disposed opposite one another and wherein physical contact with one magnet of a first magnet pair causes magnetic repulsion of a first magnet opposite it in the second magnet pair on the other side of the solid element; associating a stylus to the first magnet of the second magnet pair, wherein the stylus is disposed away from the solid element; and, securing the solid element with the magnets and stylus onto the display, wherein the stylus is in non-contact proximity to the display.

In one aspect of the method, there is additionally the step of physically touching the one magnet of the first magnet pair, thus causing the stylus associated with the second magnet pair to be depressed for contact with the display.

In another aspect of the method, the one magnet of the first magnet pair is an electromagnet.

In another aspect of the method, there is additionally an anti-friction coating on the surfaces of the element.

In another aspect of the method, the step of securing of the solid element is reversible.

The invention provides for a device for allowing transmission of a tactile signal through a rigid material to a touch screen, including: a rigid, generally flat, optically-clear element; a first stronger magnet disposed on an outer side of the element, wherein the first stronger magnet has a positive polarity facing the element; a second stronger magnet disposed on a inner side of the element physically opposite the first stronger magnet, wherein the second stronger magnet has a negative polarity facing the element; a first weaker magnet disposed on the same side as the first stronger magnet, wherein the first weaker magnet is magnetically weaker than the first stronger magnet and has its positive polarity facing the element; a second weaker magnet disposed on the same side as the second stronger magnet, wherein the second weaker magnet is magnetically weaker than the second stronger magnet and has its negative polarity facing towards the element; a stylus adapted to be in continuous contact with the touch screen; a flexible conductive element disposed between the stylus and the second weaker magnet; a plunger adapted to be depressed by a user in the direction of the element, wherein depression of the plunger causes the second weaker magnet to extend the flexible conductive element away from the stylus; a first housing adapted to hold the first stronger magnet, the first weaker magnet and the plunger; a second housing adapted to hold the second stronger magnet, the second weaker magnet, the stylus, and the flexible contact element; a conductive element attached to the second housing; and, an electrically conductive wire contacted to the conductive element and adapted to be contacted by a capacitance body.

In one aspect of the device, the touch screen is associated with a smartphone, tablet computer, watch computer, handheld computing device, camera, laptop computer or any other touch activated element.

In another aspect of the device, the first housing and the second housing are made of non-magnetic material and the first stronger magnet and second stronger magnet are in an annular shape.

In another aspect of the device, the stylus is realized as a flexible, conductive material and the flexible contact element is realized as a spring with a predetermined spring constant.

In another aspect of the device, the capacitance body is realized as an outer surface of a cellular phone, human body, car body or interior, plane interior, clothing, water, ground, building, floor, computer.

In another aspect of the device, the first housing and the second housing are adapted to be placed opposite one another on either side of the optically-clear element, with the first stronger magnet and the second stronger magnet holding each other in place due to opposite polarities facing the optically-clear element.

The invention includes a method for allowing activation of a touch screen through a rigid optically clear element, including the following: providing an optically-clear, mechanically rigid element whose dimensions are generally similar to those of the touch screen and whose thickness is selected to prevent damage to the touch screen; providing a first housing; disposing within the first housing a first stronger magnet, a first weaker magnet, and a plunger; providing a second housing; disposing within the second housing a second stronger magnet, a second weaker magnet, a conductive element contacted to a wire, a stylus, and a flexible contact element contacting at a first end the second smaller magnet and at a second end the stylus; placing the first housing on a first side of the rigid element, wherein the first stronger magnet and the first weaker magnet have their negative polarity facing towards from the rigid element; placing the second housing on a second side of the rigid element, wherein the second stronger magnet and the second weaker magnet have their positive polarity facing towards the rigid element and wherein the first housing and the second housing are generally opposite one another; placing the rigid element over a touch screen, wherein the second housing rests between the rigid element and the touch screen; securing the rigid element over the touch screen, wherein the wire is accessible in part to contact by a capacitance body; allowing contact between the wire and the capacitance body; allowing the user to depress the plunger, wherein depression of the plunger causes the second weaker magnet to contact the conductive element and allow for conductive continuity between the capacitance body and the stylus contacted to the touch screen to allow for activation of the touch screen at a position where stylus contacts the touch screen; and, allowing the user to move the first non-conductive housing to another position over the rigid element so as to activate a different region of the touch screen.

In one aspect of the method, the touch screen is associated with a smartphone, tablet computer, watch computer, hand-held computing device, camera, laptop computer or any other touch activated element.

In another aspect of the method, the capacitance body is realized as an outer surface of a cellular phone, human body, car body or interior, plane interior, clothing, water, ground, building, floor, computer.

In another aspect of the method, the touch screen is realized as a plurality of touch screens.

In another aspect of method, the plurality of first housings and a plurality of second housings are provided on both sides of the rigid element.

In another aspect of the method, the first housing and the second housing have a non-magnetic property.

The invention includes a method for allowing activation of a touch screen through a rigid optically clear element, including the following: providing an optically-clear, mechanically rigid element whose dimensions are generally similar to those of the touch screen and whose thickness is selected to prevent damage to the touch screen; providing a first magnet; providing a second magnet; providing a conductive stylus contacted to the second magnet; providing a conductive wire in conductive contact with the stylus; placing the first magnet on a first side of the rigid element, wherein the first magnet has a negative polarity facing towards from the rigid element; placing the second magnet on a second side of the rigid element, wherein the second magnet has a positive polarity facing towards the rigid element and wherein the first magnet and the second magnet are generally opposite one another; placing the rigid element over a touch screen, wherein the second magnet, the conductive element and the stylus rest between the rigid element and the touch screen; securing the rigid element over the touch screen, wherein the wire is accessible in part to contact by a capacitance body; placing the wire in a position where it may be physically contacted by a user; allowing the user to move the first magnet over the rigid element; allowing the user to contact the wire when the user wishes to activate a first location on the touch screen under the stylus; allowing user to move the first magnet; and, allowing user to again contact the wire when the user wishes to again activate a second location on the touch screen, wherein the second location is under the stylus.

In one aspect of the method, there is an additional step of placing a lubricant between the first magnet and the rigid element and between the second magnet and the rigid element.

In another aspect of the method, the optically-clear element is realized as a screen protector of a hardened cellular phone case.

Unless otherwise defined here or in the embodiments, all technical and/or scientific terms used herein have the same meaning as commonly understood by one of ordinary skill in the art to which the invention pertains. "Stronger" and "weaker" with respect to magnets refers to magnetic strength. Magnetic "polarity" may be understood to have its generally accepted meaning in the physical sciences. For reference, it is understood that a positive magnet will attract a negative magnet, while a positive magnet will repel another positive magnet. It is understood that all cases of magnetic polarity being positive or negative could be reversed without affecting the performance of the instant invention. "Element", "clear element", "protective element", "impact-resistant element", and "impact-resistant cover" generally refer to an optically-clear, solid component of the instant invention that may be placed over a touch-sensitive screen or display and has thickness and other properties to allow visualization of the touch-sensitive screen or display while providing impact and other protections to said screen or display. This cover may be constructed from many different materials types like glass, plastic, composite materials or combination of the same. A "display" or "touch-sensitive screen" according to the present invention may include any stimulus-responsive graphical user interface (touchscreen GUI for example) or the like by which a user may interact or communicate with a computing or similar device via an action of the user. Stimuli for activating a display or screen include but are not limited to touch, voice, light, and sound. A "stylus" for the present invention may be any element that physically contacts or otherwise activates a display or touch-sensitive screen to respond to a user input. A stylus may generally have an electrically conductive property and may be made of metals, composites, appropriate plastics or other materials. A stylus might work also by pressing the touch screen with no capacitance. Non-contact physical proximity, light, or other means may be used for allowing a stylus to interact with a display or similar interface. A "wire" for the instant invention may have its usual meaning in the electrical arts. In some embodiments, wire may refer to an electrically-conductive element capable of transferring, receiving, or participating in a capacitive phenomenon that may involve elements not in immediate proximity. A "capacitance body" or "capacitive body" may generally refer to any element that can hold a charge. Examples of capacitance bodies for the instant invention include a user, his/her finger, a piece of metal, a piece of plastic, an electrical device, the sidings of an electrical device, or a capacitor.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. It is noted that similar elements in various drawings will have the same number, advanced by the appropriate multiple of 100.

In the drawings:

FIG. 6 shows the second embodiment of the invention after user contact;

FIG. 7 shows a method associated with the instant invention;

FIGS. 12 & 13 show schematic views of an embodiment of the instant invention;

DESCRIPTION OF SPECIFIC EMBODIMENTS OF THE INVENTION

The present invention, in some embodiments thereof, relates to a cover for touch-sensitive screens, wherein the cover provides both strong protective features for the fragile screen, while concomitantly providing full access to the screen and its touch-sensitive functionality.

For purposes of better understanding, some embodiments of the present invention are illustrated in the figures of the drawings.

First Embodiment

Figure 1:
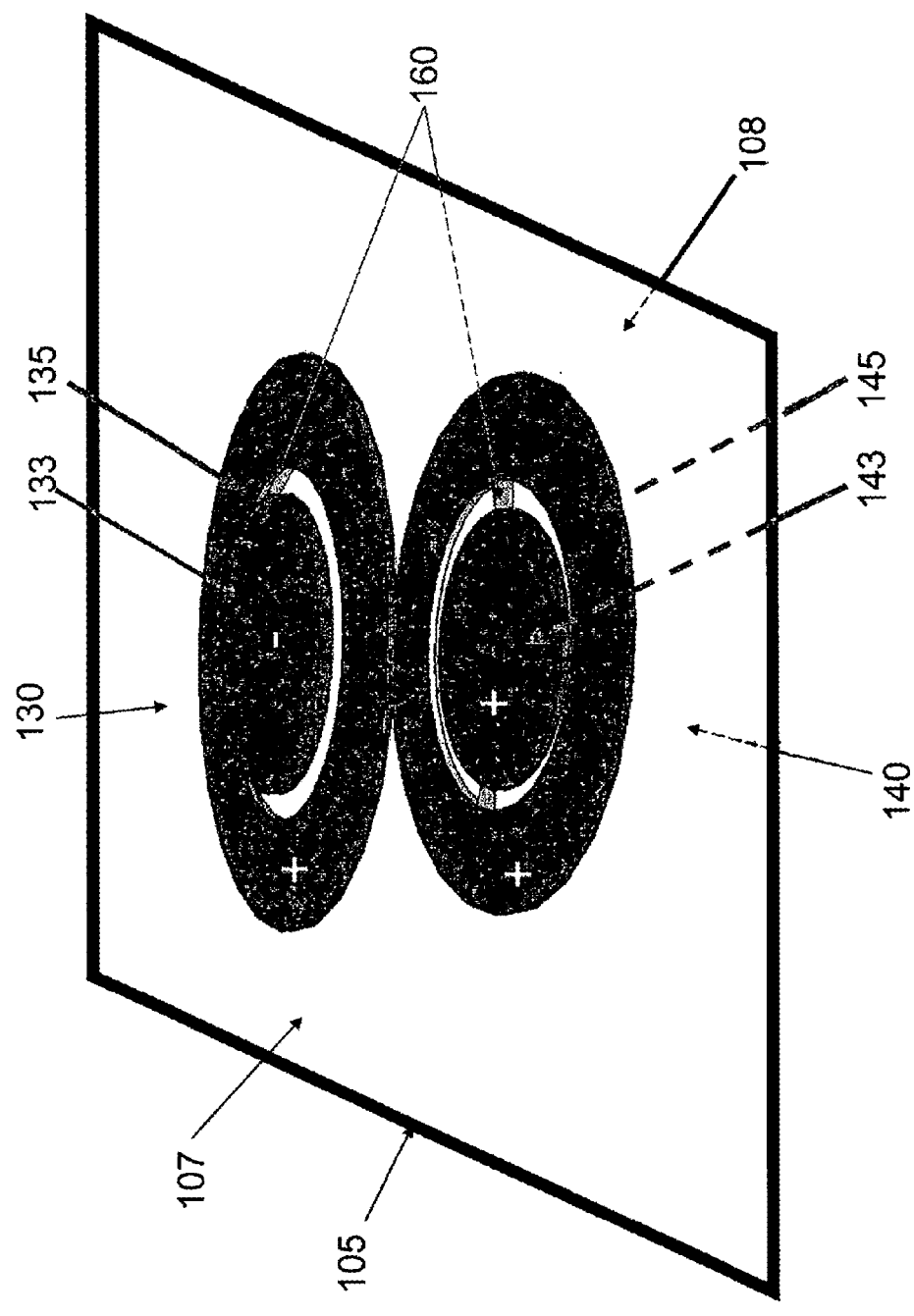
FIG. 1 shows a schematic view of an embodiment of the instant invention.

Attention is turned to FIG. 1 which shows a schematic view of an embodiment of a touch-sensitive screen protector 100. A rigid, generally flat optically clear element 105 has an outer surface 107 and an inner surface 108. The inner surface 108 is generally the side of the element 105 which is closest to a touch-sensitive or similar display (not shown) and furthest from a user (not shown) of a device that includes the aforementioned display. In this embodiment, a first magnet pair 130 is disposed on the outer side 107 of the element 105, while a second magnet pair 140 is disposed on the inner side 108 of the element 105. Each magnet pair 130 & 140 includes at least two magnets: the outer magnet pair 130 includes magnets 133 & 135, while the inner magnet pair 140 includes magnets 143 & 145. The magnets in the drawings are circular magnets, the circle shape being just an option and the magnets may be of any relevant shape, size or composition. In a typical embodiment, magnets 133, 135 & 145 have a positive polarity as measured relative to element 105. Magnet 143 has a negative polarity. The outcome of this arrangement around the element 105 is an attractive arrangement between magnets 133 & 143 due to their respective positive and negative polarities relative one another. As such, magnets 133 & 143 keep the first magnet pair 130 and the second magnet pair 140 securely facing one another around the element 105. The remaining magnets 135 & 145 have identical polarities (+) facing the surfaces of the elements 105. Joining element 160 holds magnets 133 & 135 together; magnets 143 & 145 may include joining elements as well as additional elements such as a spring (not shown) to aid in their combined functionality.

Figure 2:
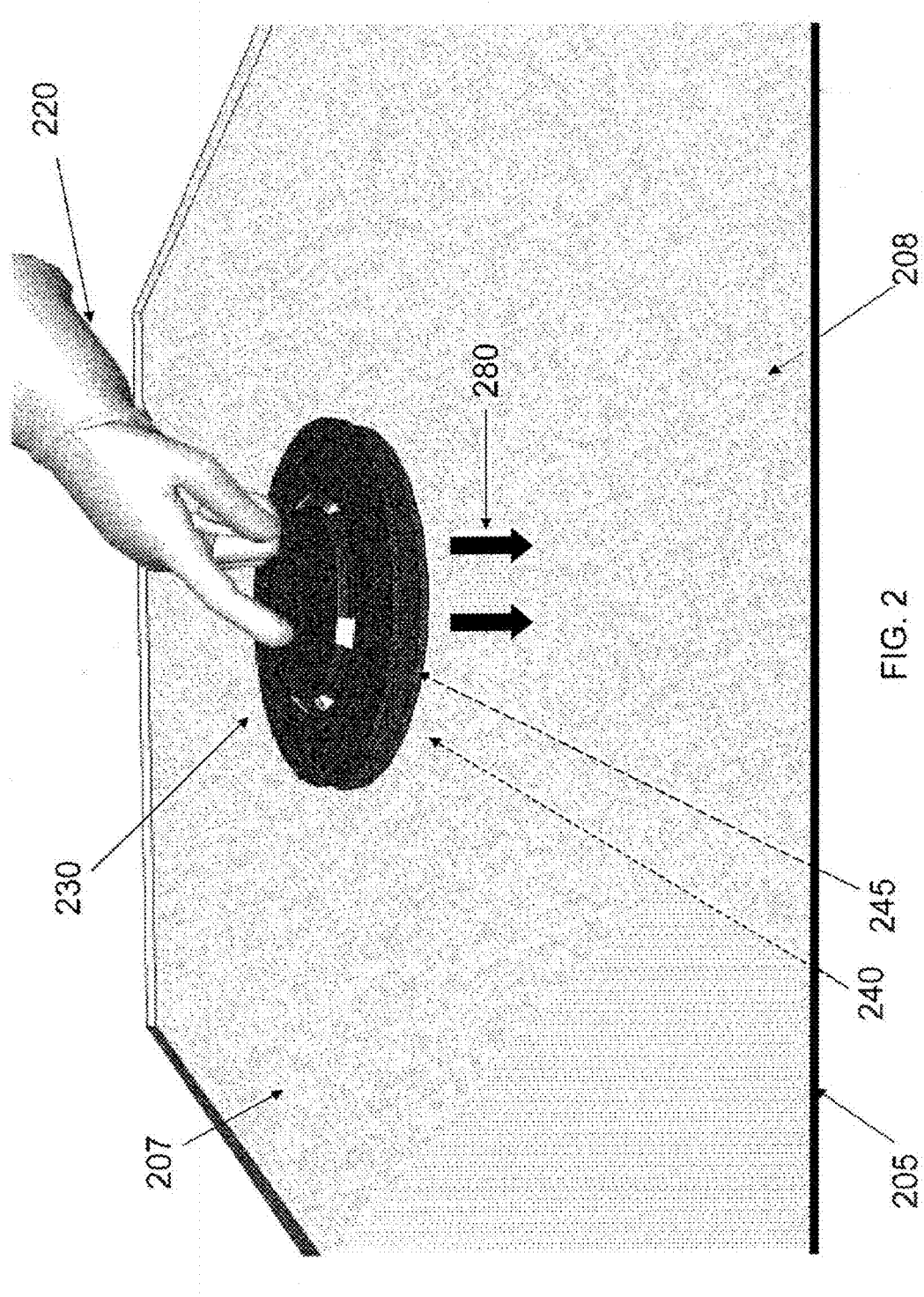
FIG. 2 shows an additional view of the first embodiment of the invention.

Attention is turned to FIG. 2. User 220, in touching the first magnet pair 230 and pushing it towards the outer surface 207 of the protective element 205 causes magnet 245 to be pushed away from the inner surface 208 of protective element 205 due to the magnets 235 & 245 having identical polarity as measured facing the element 205. In this arrangement, a tactile action by user 220 on one side of the element 205, namely depressing magnet pair 230, may lead to a downward displacement 280 of a magnet 245 on the other side of the element 205, though the element 205 may be electrically non-conducting.

Figure 3:
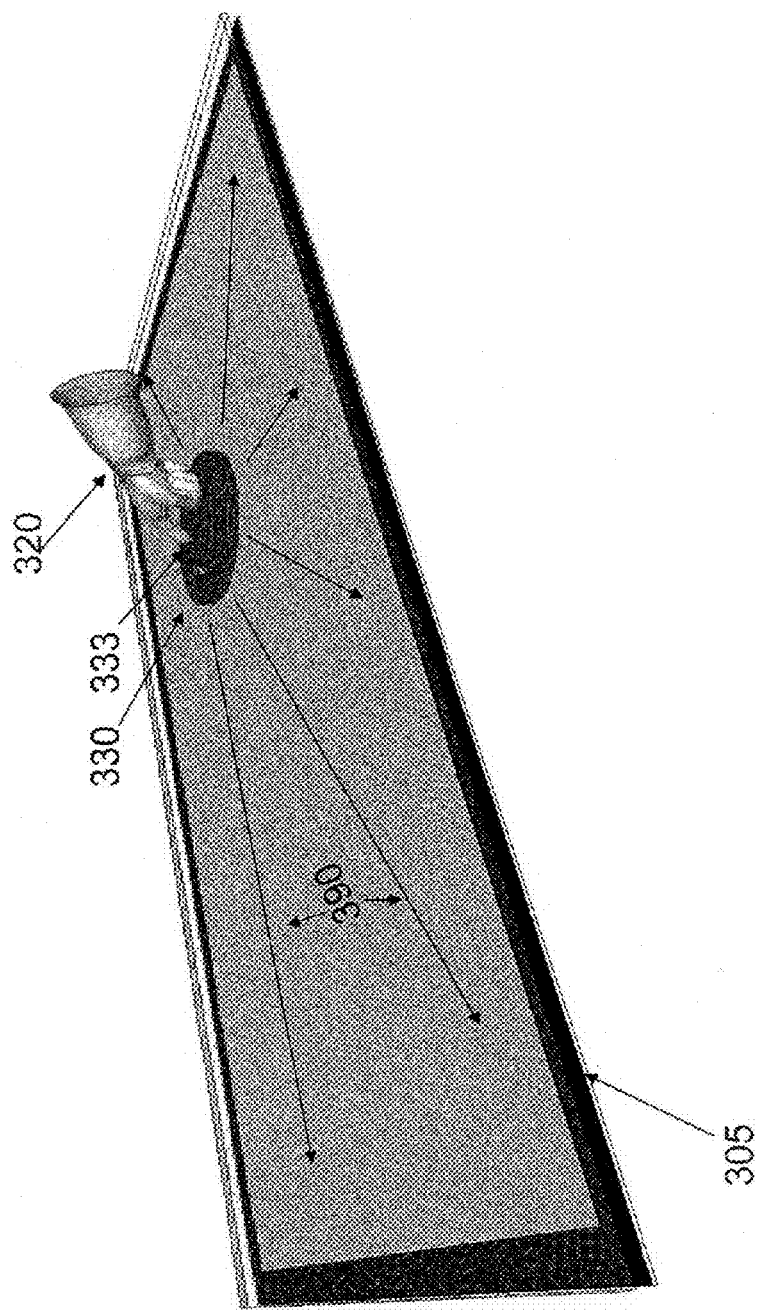
FIG. 3 shows an additional view of the first embodiment of the invention.

Attention is turned to FIG. 3. Magnet pairs may move over the surfaces of the element 305 through user 320 pushing on magnet 333 of the first magnet pair 330. An anti-friction coating (not shown) may be placed on one or both sides of the element 305 to facilitate travel of magnet pairs over the element 305 as suggested by arrows 390. Alternatively, the anti-friction coating may be associated with the magnets themselves. User 320 may push on the magnet 333 involved in holding the magnet pairs to the element 305 when he/she wishes to move the magnet pairs over the element 305. He/she then may depress the other magnet (FIG. 1, 135) so as to cause the opposite magnet 145 to be displaced from the surface 108 of the element, as shown clearly in FIG. 1. Unlike the prior art, the instant embodiment as described in FIG. 3 allows for full access to every area of a touch-screen or similar responsive display.

Figure 4:
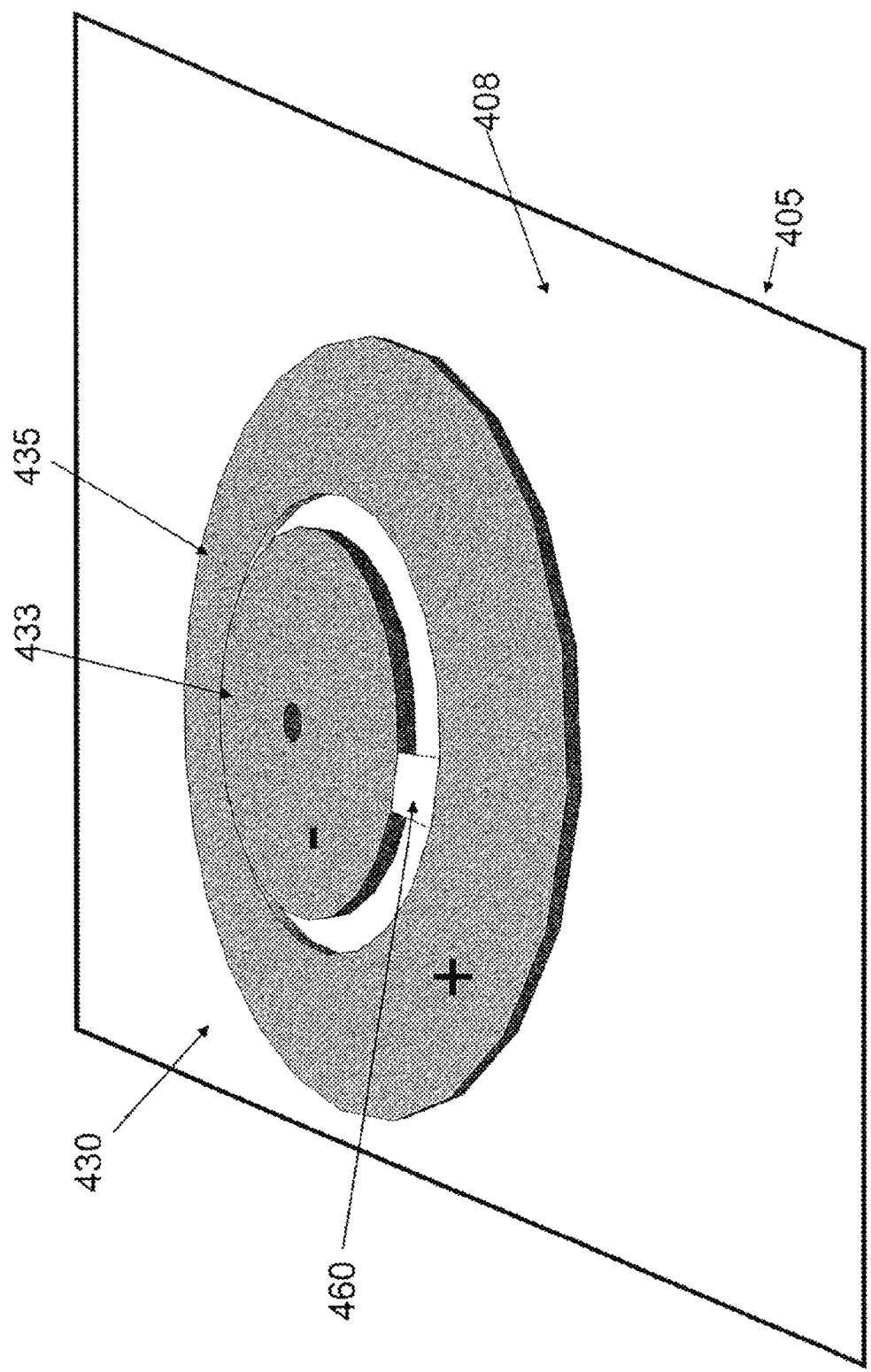
FIG. 4 shows a detailed view of an outer magnet pair.

FIG. 4 shows a close-up of magnet pair 430 which includes attachment magnet 433 and tactile transfer magnet 435. To move the magnet pair, a user (not shown) will generally put his/her finger on the magnet 433, whose polarity is opposite that of the magnet on the other side of the rigid, flat protective element 405. When user wishes to transfer a tactile signal through the element 405, then he/she pushes on magnet 435 which causes the second magnet pair (not shown) or a portion thereof to be displaced from the inner surface of the protective element 405 due to magnetic repulsion. The system thus allows for moving the magnets over the element 405 and for transferring tactile information at a predetermined position of the user's choosing. A plurality of joining elements 460 hold magnets 433 & 435 together; the same elements 460 are used in the second magnet pair. The + and − polarities shown on magnets 433 & 435 are relative to the outer surface 408 of element 405.

Second Embodiment'

Figure 5:
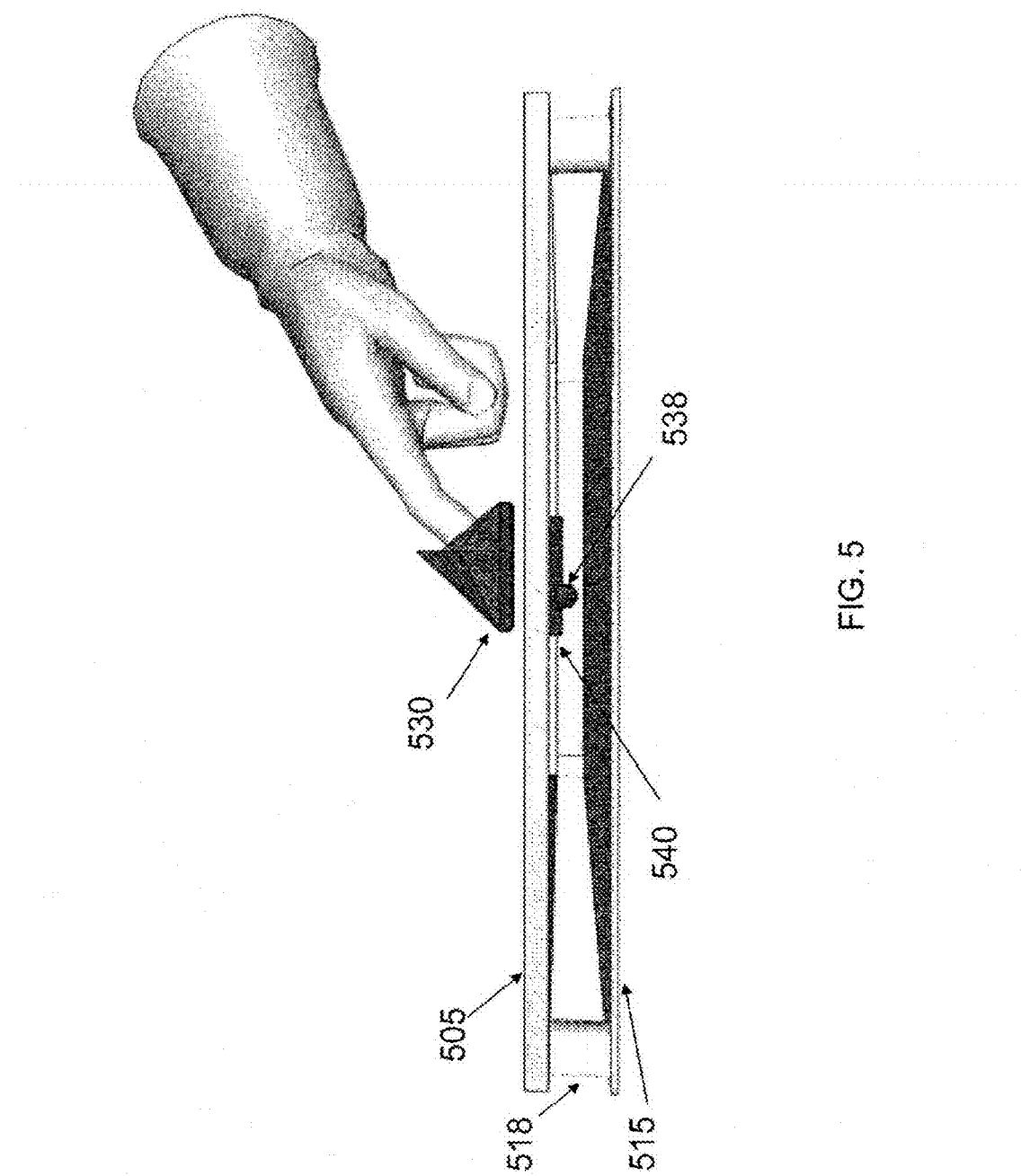
FIG. 5 shows a second embodiment of the instant invention prior to user contact.

Attention is now turned to FIG. 5 which shows a schematic view of an embodiment of the instant invention. A touch-sensitive display 515 associated with a cellular phone, tablet computer, watch, handheld electronic device or the like is covered with an element 505 which is impact resistant. Holding features 518 may be used to fasten the element to the display 515 so as to leave space 580 between element 505 and display 515. Such features 518 include but are not limited to clips and contact elements. Contact elements may be any features that aid in attaching the element 505 proximate the surface of the display 515. The impact resistant element 505 has an upper magnet pair 530 and a lower magnet pair 540. The upper magnet pair 530 is shown slightly displaced above the element, though—as described in the previous embodiment—only one of the two magnets of the magnet pair 530 is generally displaced from the element 505 surface. A stylus 538 capable of activating the touch-sensitive display 515 is disposed on the side of the lower magnet pair 540 facing the touch-sensitive display 515. The stylus 538 is selected for properties which allow for activation of the touch-sensitive display 515 specifically when stylus 538 and display 515 are in physical contact or in a proximate relationship that allows for display 515 activation. FIG. 5 shows the situation when a user (not shown) does not wish to click or otherwise interact with the touch-sensitive display 515: the stylus 538 is disposed above, but not in contact with, the display 515 and thus does not in any way cause the display to register activity. In this arrangement, user may move the magnet pairs 530 & 540 with the stylus 538 to a position over any part of the display 515 as previously described in the previous embodiment. It is understood that in some embodiments, the stylus does not need to actually physically contact the display 515 in order to cause the display 515 to respond to user action. Approach of stylus 538 to a closer non-contact position may be enough to allow the display to react to a user's action.

Attention is now turned to FIG. 6. User 620 pushes on upper magnet pair 630 or the positive magnet (not shown for clarity) of the upper magnet pair 630. This push of the magnet pair 630 causes the lower magnet pair 640 or a portion thereof to be displaced away from the surface of the element 605, thus causing stylus 638 to physically contact and activate the display 615. The contact of stylus 638 with display 615 leads to an input 695 in the display 615. By removing his/her finger, user 620 thus causes the stylus 638 to move away from the display 615 surface and return to the state shown in FIG. 5.

As described in the present embodiment, one may use a solid, impact-resistant element 505 to allow for transfer of tactile information from a user (FIG. 6, 620) to a touch-sensitive display 615. The instant invention thus allows for maximum protection of a generally fragile display 615 with full access to said display's functional capabilities. In its default position, the stylus 638 does not touch the display 615, whether the magnet pairs 630 & 640 are moving over the surface of the element 605 or staying in place. Only with an active push or the like from user 620 does stylus 638 contact, come closer to or otherwise cause a response in the display 615, allowing for an input 695 to be registered by the device associated with said display 615. It is noted that a spring 688 or other attachment component (not shown) may be attached between the element 605 and the lower magnet pair 640 to allow for movement of the magnet pair 640 and the associated stylus 638 away from the element 605 and back again after removal of user 620 input.

Third Embodiment

Attention is now turned to FIG. 7 which describes a method for protecting a touch-screen display from physical damage, including: providing an optically clear solid element whose dimensions are similar to those of the display and whose thickness is selected to prevent damage to the display; disposing magnet pairs on either side of the solid element, wherein the magnet pairs are disposed opposite one another and wherein physical contact with one magnet of a first magnet pair causes magnetic repulsion of a first magnet opposite it in the second magnet pair on the other side of the solid element; associating a stylus to the first magnet of the second magnet pair, wherein the stylus is disposed away from the solid element; and, securing the solid element with the magnets and stylus onto the display, wherein the stylus is in non-contact proximity to the display. The method herewith described allows a user to interact with a touch-sensitive display through the medium of a optically-clear, thick cover. As described, magnet pairs are placed opposite one another, with a touch-sensitive display stylus being disposed on the inner magnet pair, facing towards but not contacting the touch-sensitive display. A user may move the magnet pair anywhere over the touch-sensitive display, as the cover is selected to have a surface approximately the same size as the reactive area of the touch-sensitive display. When a user wishes to enter data, he/she simply pushes on a position of the upper magnet pair, thus displacing the lower magnet pair and its associated stylus, the stylus contacting the display and entering a signal into the device associated with the display. A friction-reducing coating associated with the magnet pairs and/or the cover may aid in easy movement of the stylus from position to position over the display.

EXAMPLE 1

A smart phone with a five inch touch-sensitive screen is provided. A piece of clear Plexiglas® having a thickness of four millimeters has magnet pairs disposed on either side, wherein said magnet pairs are opposite one another, with a stylus associated with the inner magnet pair. The Plexiglass is fastened to the smart phone, so that the stylus is in a non-contact proximity (generally less than 2 millimeters) away from the touch-sensitive screen of the smart phone. The upper magnet pair is accessible to user touch, and user may either contact the upper magnet to move it and the associated lower magnet to any position on the Plexiglass cover. Alternatively, at a predetermined and desired position, user may press the upper magnet pair to cause, through magnetic repulsion, the stylus to be depressed in order to activate the touch-sensitive screen of the smart phone, thus causing the smart phone to register a contact similar to that of a human finger. Thus, should a user wish to dial the phone number 312-3124, he/she, would sequentially move the magnet pairs over the numbers (3 then 1, then 2, etc.) and when the magnet pair is over the correct number, he/she would push the appropriate magnet of the upper magnet pair to cause the stylus attached to the lower magnet pair to contact the number on the touch sensitive display immediately under the magnet pairs. Magnet pairs may be miniaturized, be made of clear material, or otherwise manipulated or treated to as to allow user maximum visual access to the touch-sensitive screen of the smart phone.

Figure 8:
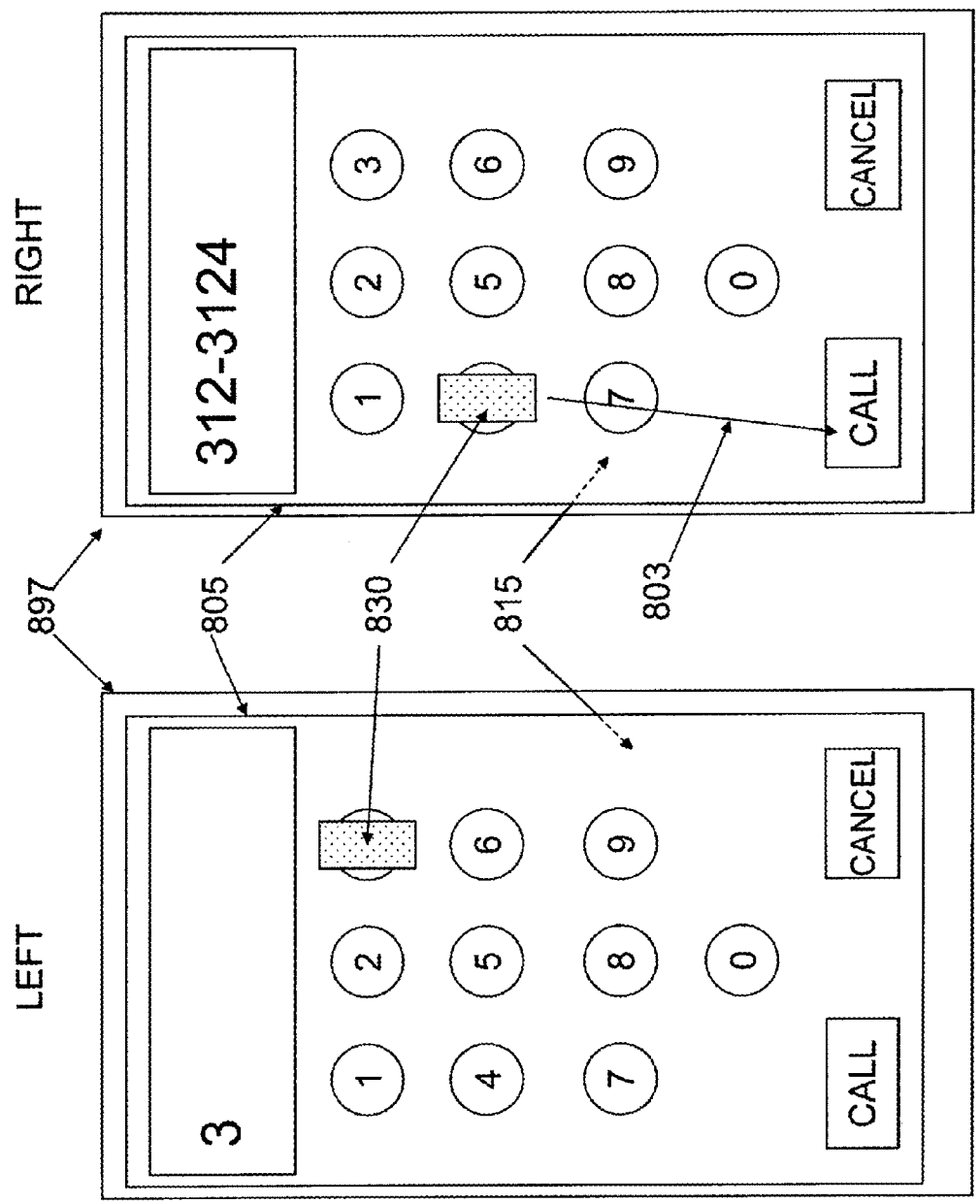
FIG. 8 shows a schematic view of an embodiment of the instant invention associated with an example.

Attention is turned to FIG. 8, which shows a smart phone 897 over whose touch sensitive screen 815 is placed an impact-resistant cover 805. The upper magnet pair 830 is visible from this top view and rests over the lower magnet pair with stylus (blocked from view). On the left, the upper magnet 830 is shown over the number three immediately after a user (not shown) has depressed the "3" button on the screen by pressing on the upper magnet pair 830. The number "3" appears on the screen. In the figure on the right, the upper magnet pair 830 is located over the number "4" of the touch-sensitive display 815 after user has finished entering the final digit of the telephone number listed above. User may now move the magnet pairs to the "Call" button as suggested by arrow 803. When user pushes on the upper magnet pair 830 over the "Call" button, the smart phone will begin dialing the entered number and placing the desired call.

Fourth Embodiment

Figure 9:
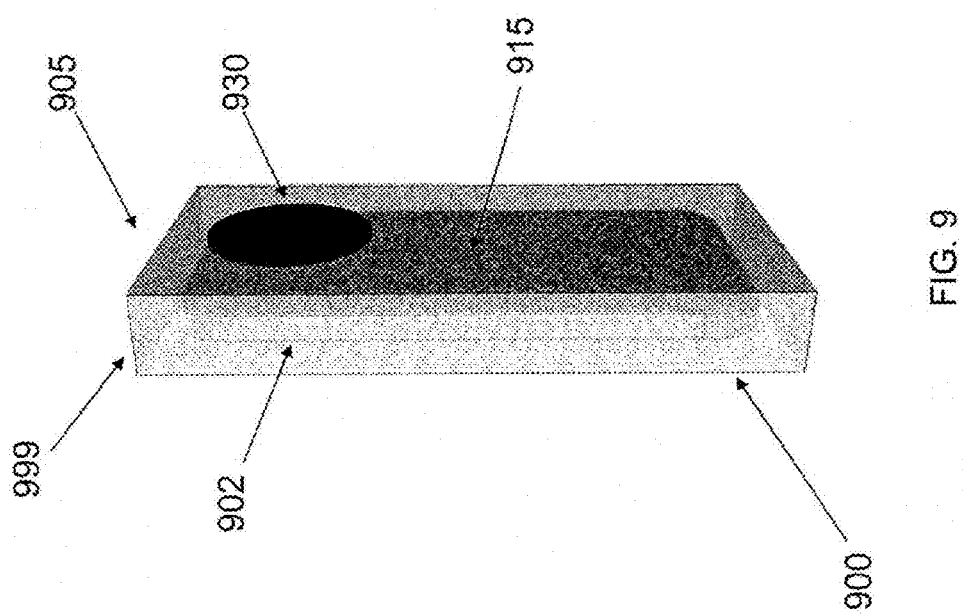
FIG. 9 shows a schematic view of an embodiment of the instant invention integrated into a cell phone case.

Attention is now turned to FIG. 9 which shows an embodiment of the instant invention in which a touch-sensitive screen protector 900 is integrated into a cellular phone protection device 999. As previously noted, most prior art screen protectors are either very thin to allow continued touch sensitivity or thick and do not allow for access to the touch screen when the screen is protected. The same issues dog cell phone cases: either they do not particularly cover the touch-sensitive screen or they cover it to offer maximum protection, at the expense of allowing use of the screen when the phone is protected (for example, http://reviews.cnet.com/2300-6448_7-10004905-2.html). In FIG. 9, a cell phone 902 is encased in a cellular phone protection device 999. The protection device 999 includes a screen protector 900 that is minimally composed of an impact resistant cover 905 and associated magnets 930 (only the outer magnets 930 resting outside of the cover 905 are visible in this view). Magnets 930 allow for a user (not shown) to access the touch-sensitive screen 915 associated with the cell phone 902 by means previously described. It is understood that the immediate embodiments may be applied to tablet computers and other mobile computing devices and unlike the prior art provide protection and screen access simultaneously.

Fifth Embodiment

Figure 10:
FIG. 10 shows a method associated with the instant invention.

Attention is turned to FIG. 10. The invention includes a method for allowing activation of a touch screen through a rigid optically clear element, including the following: providing an optically-clear, mechanically rigid element whose dimensions are generally similar to those of the touch screen and whose thickness is selected to prevent damage to the touch screen; providing a first housing; disposing within the first housing a first stronger magnet, a first weaker magnet, and a plunger; providing a second housing; disposing within the second housing a second stronger magnet, a second weaker magnet, a conductive element contacted to a wire, a stylus, and a flexible contact element contacting at a first end the second smaller magnet and at a second end the stylus; placing the first housing on a first side of the rigid element, wherein the first stronger magnet and the first weaker magnet have their negative polarity facing towards from the rigid element; placing the second housing on a second side of the rigid element, wherein the second stronger magnet and the second weaker magnet have their positive polarity facing towards the rigid element and wherein the first housing and the second housing are generally opposite one another; placing the rigid element over a touch screen, wherein the second housing rests between the rigid element and the touch screen; securing the rigid element over the touch screen, wherein the wire is accessible in part to contact by a capacitance body; allowing contact between the wire and the capacitance body; allowing the user to depress the plunger, wherein depression of the plunger causes the second weaker magnet to contact the conductive element and allow for conductive continuity between the capacitance body and the stylus contacted to the touch screen to allow for activation of the touch screen at a position where stylus contacts the touch screen; and, allowing the user to move the first non-conductive housing to another position over the rigid element so as to activate a different region of the touch screen. Stronger and weaker with respect to magnets refers to magnetic strength and not size of magnets. Stronger magnets are generally used to hold the two housings on the rigid element. The weaker magnets are generally involved in transducing user action into touch screen response. The housings are generally apart from each other, transiently held in tight position by the stronger magnets, whose polarities are facing each other, on opposite sides of the rigid cover or element. The plunger is depressed, which pushes the first weaker magnet downwards towards the rigid element; the second weaker magnet is pulled upwards, away from the touch screen and towards the conductive element. When the second weaker magnet contacts the conductive element, conductivity is established: capacitance body→wire→conductive element→conductive flexible contact element→stylus→touch screen. The capacitance body may be realized as an outer surface of a cellular phone, human body, car body or interior, plane interior, clothing, water, ground, building, floor, computer or any material that can hold some level of capacitive charge. The conductive flexible contact is generally realized as a metallic spring that allows the second weaker magnet to move towards the rigid element, while maintaining contact between the conductive stylus and the second weaker magnet. Completion of this open circuit leads to the touch screen responding to position where the stylus is located. Thus, if the stylus is over the number "2" on a phone touch screen, for example, the number 2 will be activated and the number 2 will appear in the telephone number screen (not shown). The first housing may be moved by a user (human or mechanical), with the second housing following, due to the presence of the first stronger magnet and the second stronger magnet which keep the first housing and the second housing together as they move over the surface of the rigid element. When the housings are over a new location, user may again engage the plunger to cause the touch screen to register a new input, say the number "4", which will then appear in the phone number screen after the previously depressed "2".

Sixth Embodiment

Figure 11:
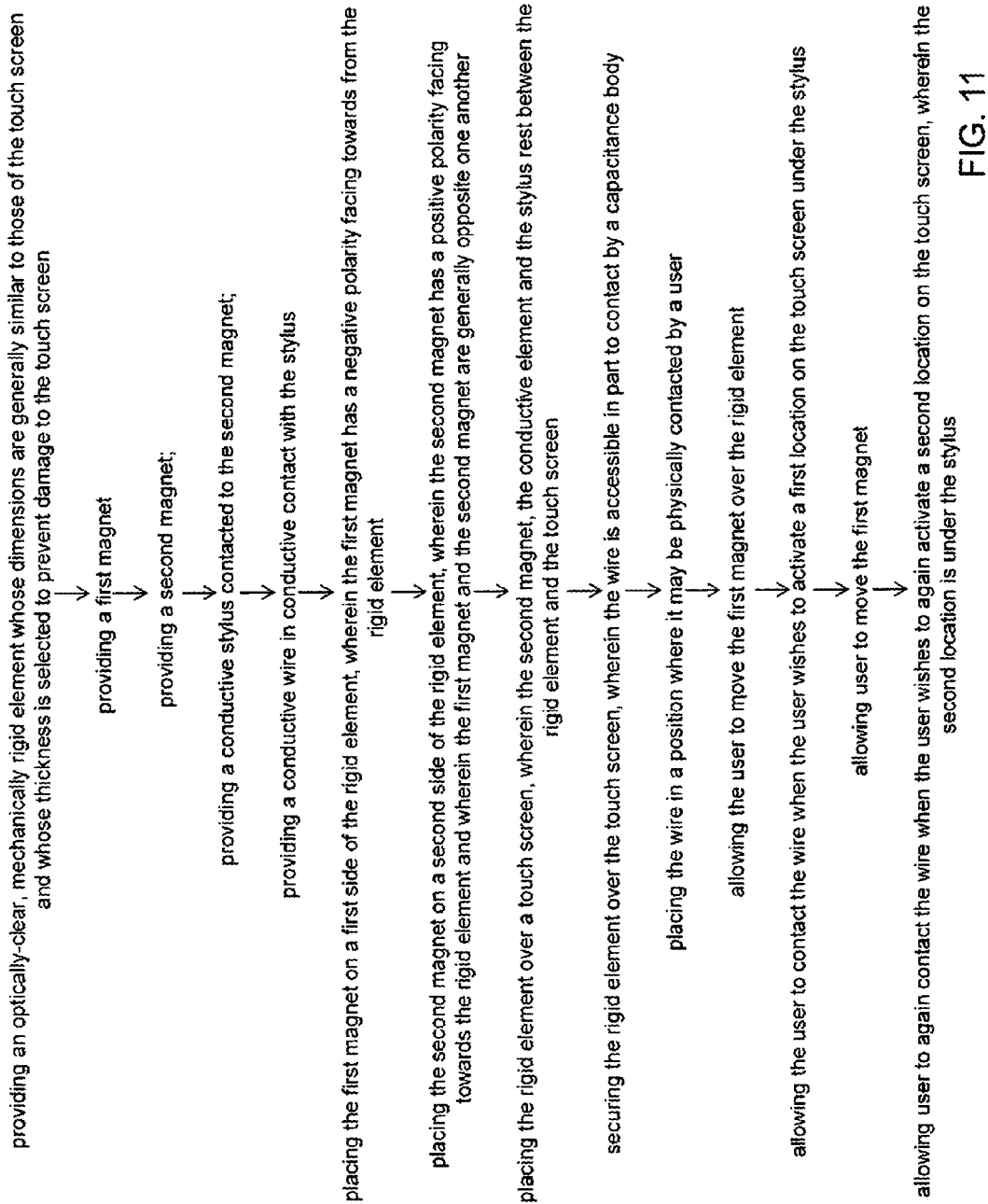
FIG. 11 shows a method associated with the instant invention.

Attention is turned to FIG. 11. The invention includes a method for allowing activation of a touch screen through a rigid optically clear element, including the following: providing an optically-clear, mechanically rigid element whose dimensions are generally similar to those of the touch screen and whose thickness is selected to prevent damage to the touch screen; providing a first magnet; providing a second magnet; providing a conductive stylus contacted to the second magnet; providing a conductive wire in conductive contact with the stylus; placing the first magnet on a first side of the rigid element, wherein the first magnet has a negative polarity facing towards from the rigid element; placing the second magnet on a second side of the rigid element, wherein the second magnet has a positive polarity facing towards the rigid element and wherein the first magnet and the second magnet are generally opposite one another; placing the rigid element over a touch screen, wherein the second magnet, the conductive element and the stylus rest between the rigid element and the touch screen; securing the rigid element over the touch screen, wherein the wire is accessible in part to contact by a capacitance body; placing the wire in a position where it may be physically contacted by a user; allowing the user to move the first magnet over the rigid element; allowing the user to contact the wire when the user wishes to activate a first location on the touch screen under the stylus; allowing user to move the first magnet; and, allowing user to again contact the wire when the user wishes to again activate a second location on the touch screen, wherein the second location is under the stylus. Lubricants such as graphite may be placed between magnets and rigid element to ease motion of the magnets. The magnets may be encased in optional casings for aesthetic or other purposes. In this embodiment, there are only two magnets, one above the rigid element and one below the rigid element, their polarities arranged so that the two magnets hold each other tightly to the rigid element. In this embodiment, the stylus is in constant contact with the second magnet, and there is a conductive wire attached to the stylus. In this embodiment, a user (human or otherwise) moves the first magnet, which moves the second magnet and the stylus which always rests in contact with the touch screen. Only when user contacts the wire, is there a capacitive event that allows for stylus to register a response on the touch screen where the stylus is located. After contact with wire and registration by touch screen of user action, the first magnet may be moved to a new location, where user may again contact wire and cause a new response in the touch screen.

Seventh Embodiment

Figure 12:
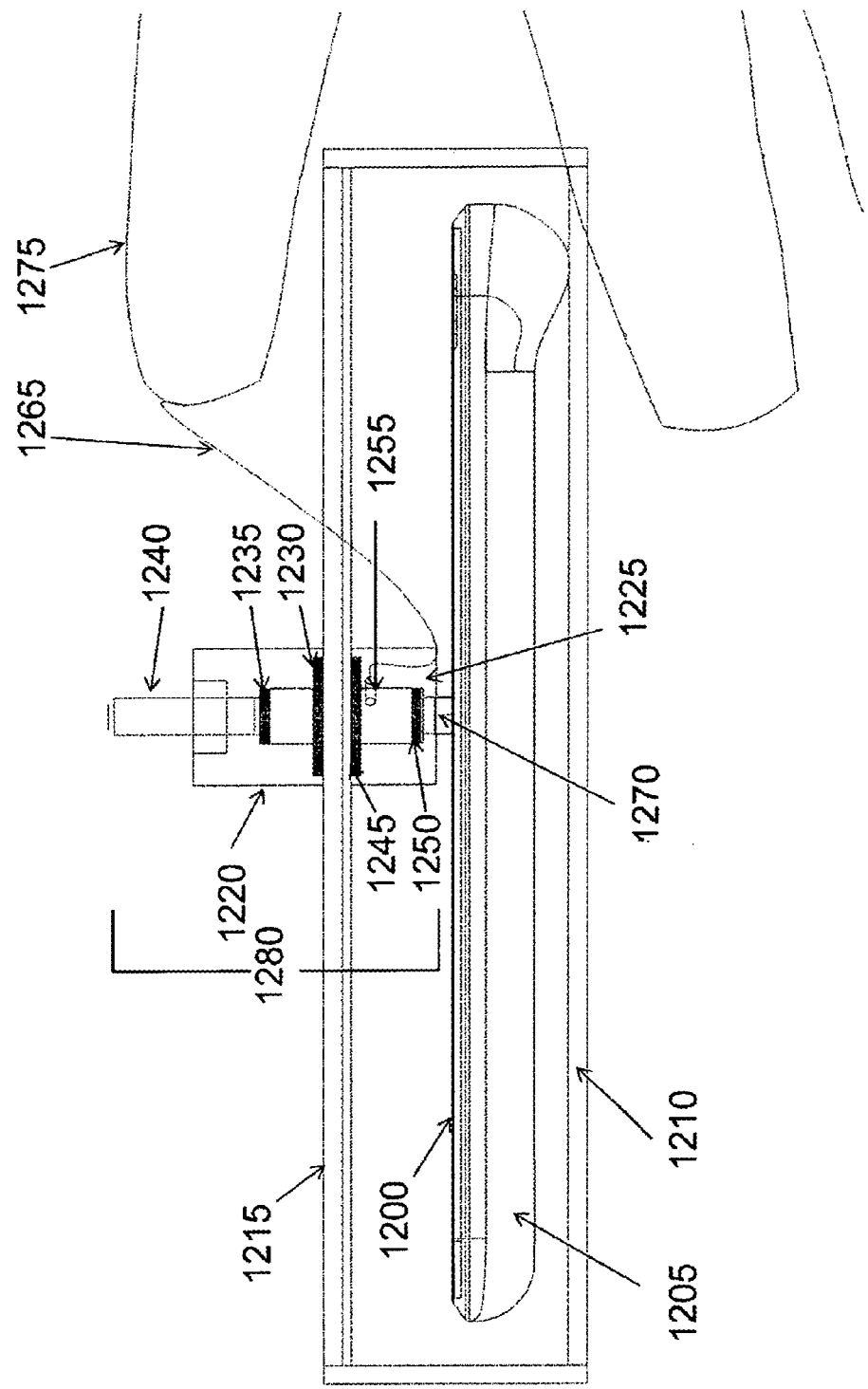
FIG. 12 and beyond have a numbering system that may vary with that employed in earlier figures.

Attention is turned to FIG. 12 which shows a schematic view of an embodiment of the instant invention. A touch screen 1200 associated with a smart phone 1205 is encased in a protective case 1210 that includes a rigid, optically-clear cover 1215 positioned over the touch screen 1200. Around said cover 1215 are placed a first housing 1220 and a second housing 1225. The first housing 1220 includes a stronger magnet 1230, a weaker magnet 1235 and a plunger 1240. The second housing 1225 includes a stronger magnet 1245, a weaker magnet 1250, a conductive element 1255, a flexible connector element (not visible in this view), a wire 1265 extending outside of the case 1210 and a stylus 1270. In the view shown in FIG. 12, the touch screen 1200 is not activated, though the stylus 1270 rests on the active face of the touch screen 1200. As user 1275 does not have capacitive interaction with stylus 1270, there is no signal input on the touch screen. The first housing 1220 is amenable to user 1275 accessible, wherein user 1275 may move the first housing 1220 and its contents over the face of the cover 1215. The stronger magnet 1230 has a magnet, generally annular in shape, that has a stronger magnetic field than the weaker magnet, which is generally disposed above the stronger magnet. The stronger magnet 1230 sits close to the cover 1215 and interactions magnetically with the stronger magnet 1245 of the second housing 1225 which sits between the cover 1215 and the touch screen. The stronger magnets 1230 & 1245 thus keep the first housing 1220 and the second housing 1225 sitting across from one another, wherever user 1275 moves the assembly 1280 relative to the touch screen. The weaker magnet 1250 is disposed below the stronger magnet 1245 and is not contacted to the conductive element 1255 which is attached to the wire 1265 that is accessible to user 1275. The stylus 1270 is connected to the weaker magnet 1245 by the agency of a flexible element that is compacted and not visible in the instant figure.

Figure 13:
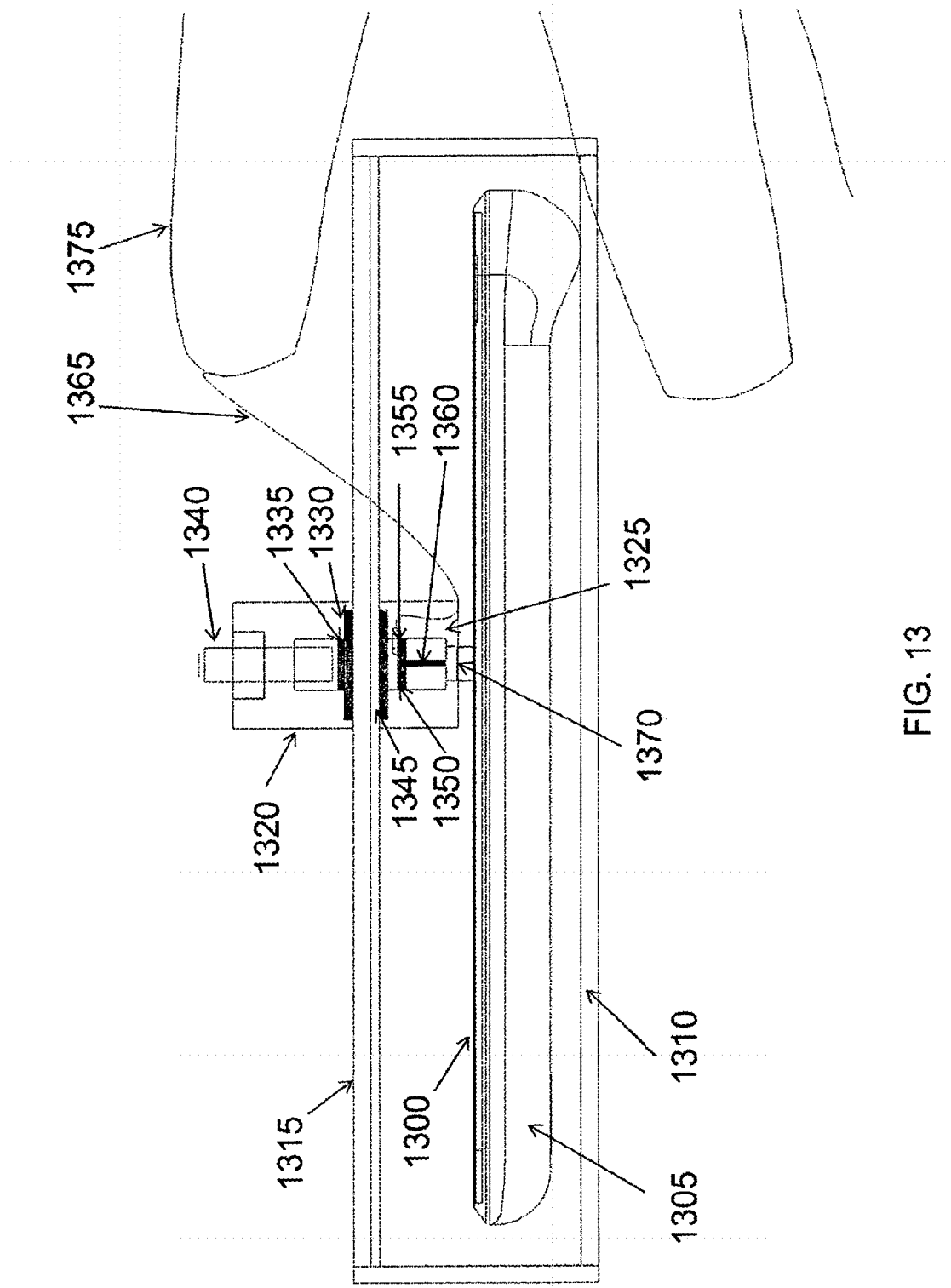

Attention is turned to FIG. 13. The plunger 1340 has been depressed by user 1375 (not shown for purposes of clarity). User 1375 is shown as a human in the form of a hand, but it is understood that a "user" could be a computer, machine or other non-human element. Depression of plunger 1340 towards the cover 1315 causes the weaker magnet 1335 within the first housing 1220 to be pushed down towards the stronger magnet 1330. The result of the weaker magnet 1335 movement is to cause the weaker magnet 1350 of the second housing 1225 to move upwards away from the touch screen 1300 and towards the stronger magnet 1345. The weaker magnet 1345 contacts the conductive element 1355. An electrically conductive flexible contact element 1360 leads to a direct electrical connection as follows: user 1375→wire 1365→conductive element 1355→conductive flexible contact element 1360→stylus 1370→touch screen 1300. The net effect is as if the user 1375 was contacting the touch screen 1300 directly. When this electrical connection is created, touch screen 1300 registers an action as per the location of the stylus 1370 on the touch screen 1300. As noted previously, the stylus 1370 always rests on the touch screen 1300 but is only activated, when user 1375 dependent depression of plunger 1340 causes the weaker magnet 1345 to contact the conductive element 1355 associated with the second housing 1325 and allow user 1375 indirect contact of the touch screen 1300.

It is appreciated that the touch screen 1300 could be associated with any relevant device including but not limited to smart phones, tablet computers, watches, cameras, laptops, electronic devices, military devices, computing devices and the like. The housings 1320 & 1325 are generally made from non-magnetic materials such as plastics. The cover 1315 is generally rigid and optically-clear. It may be selected along with the case 1310 for purposes of protecting the smartphone 1305 from expected threats. The wire 1365 does not necessarily have to contact a user 1375 but may be attached to any capacitive body, such as a cell phone, metal element, cell phone connectors or the like. The magnets of the instant embodiment may be made from any relevant magnetic materials. Larger magnets 1330 & 1345 are selected and placed so that their opposite polarities cause them to be attracted and held in place on either side of the cover 1315. Opening the case 1310 allows for separation of the housings 1320 & 1325 for use on other devices. The conductive flexible connector element 1360 is generally realized as a spring of known spring constant to allow for compression of the smaller magnet 1350 when plunger 1340 is not depressed as well as full extension of smaller magnet 1350 when plunger 1340 is depressed. The stylus 1370 may be made of any relevant material though metals and conductive polymers are especially useful.

Eighth Embodiment

Figure 14:
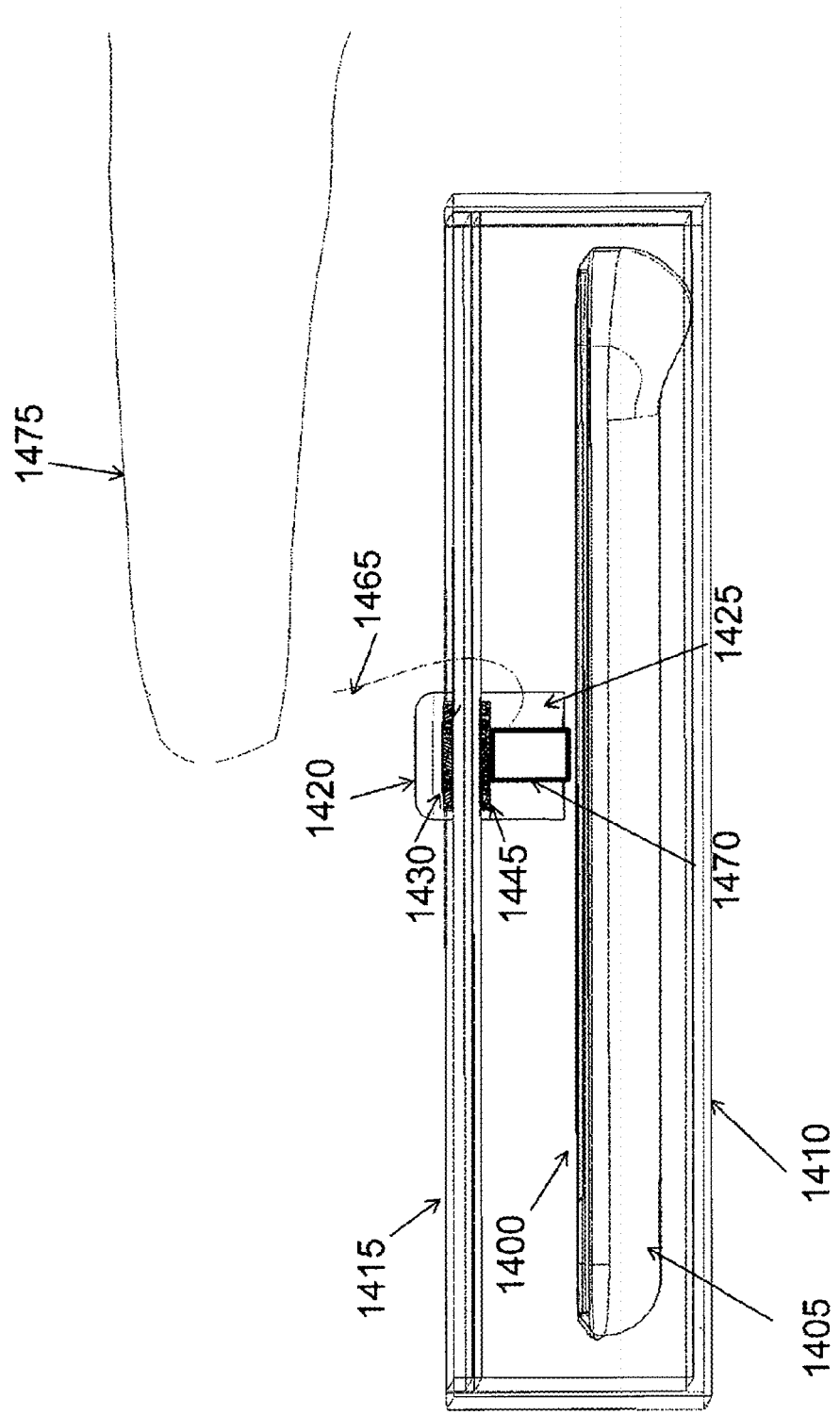
FIGS. 14 & 15 show schematic views of an embodiment of the instant invention; and, FIGS. 16 & 17 show black and white photographs relating to embodiment of the instant invention employed in an example of the invention.
Figure 15:
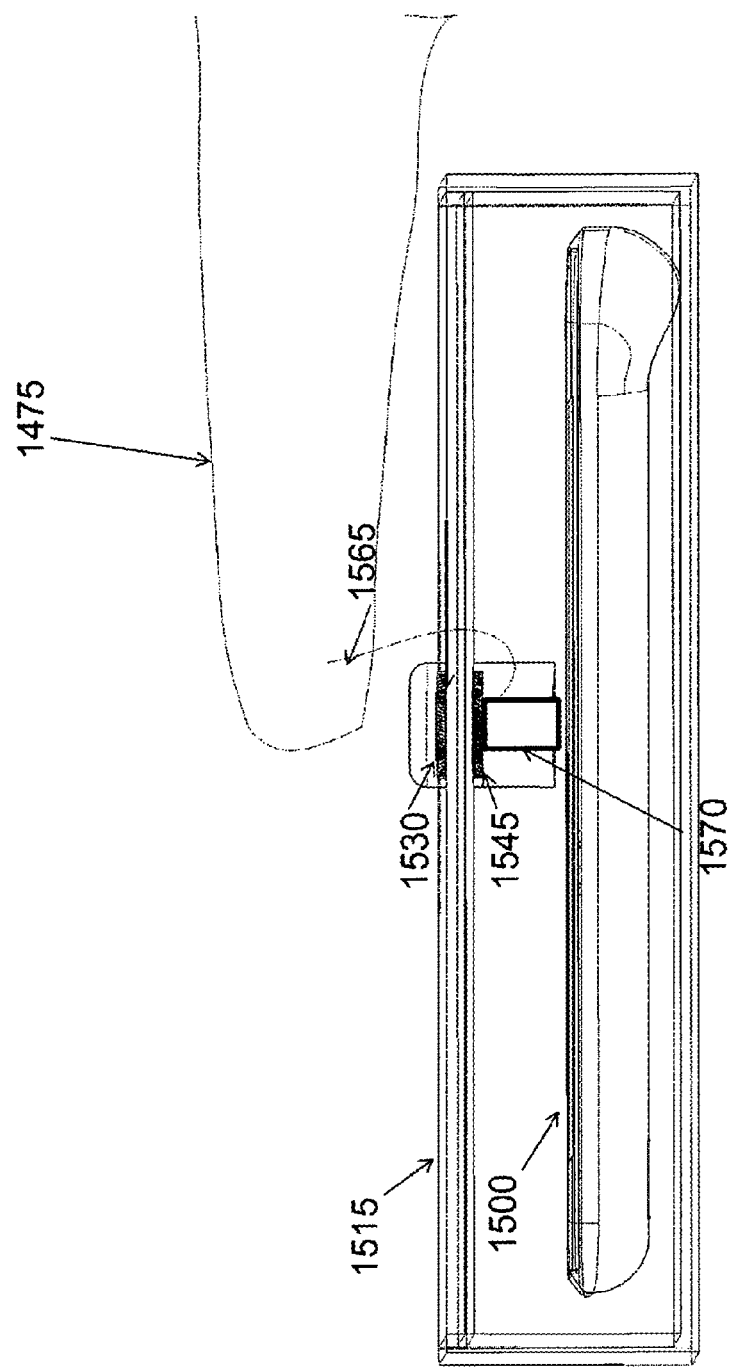

Attention is turned to FIG. 14. A touch screen 1400 is associated with a smart phone 1405 is placed in a damage-proof case 1410. The case 1410 includes a removable first magnet 1430 and a removable second magnet 1445 placed opposite one another around a cover 1415 associated with the case 1410. The magnets 1430 & 1445 may optionally be associated with housing units 1420 & 1425, though such units are not required. The magnet 1445 is contacted to an electrically conductive stylus 1470 that rests on the touch screen 1400 continuously. An electrically-conductive wire 1465 is attached to the stylus 1470. The wire extends outside of the case 1410, where a user 1475 may contact it. In this embodiment, user 1475 moves the magnet 1430 and by necessary extension magnet 1445 and stylus 1470 to a position over the touch screen 1400. Attention is turned to FIG. 15. When user 1575 wishes to activate a feature of the touch screen 1500 where the stylus 1570 rests, he/she contacts the exposed portion of the wire 1565 which leads to a capacitive event between user 1575 and the touch screen 1500 via the conductive wire 1565 and stylus 1570, causing the touch screen to take an appropriate action—as if the user 1575 himself/herself had touched the screen 1500 with his/her finger. User 1575 may let go of wire 1565 and then contact wire 1565 again to have the touch screen 1500 respond again to the contact of the stylus 1570 to the touch screen 1500 in the same position. Additionally or alternatively, user 1575 may move the magnet 1530 to a new position on the cover 1515 and then contact the wire 1565 to activate a new position on the touch screen 1500, one immediately under the repositioned stylus 1570. A graphite or other lubricant (not shown) may be used to allow for more facile movement of the magnets 1530 & 1545 over the cover 1515. The instant embodiment does not require a plunger or additional "weaker magnets" to work. A capacitive body other than a user 1575 may be used to activate touch screen 1500 via stylus 1570 if so desired.

EXAMPLE 2

Figure 16:
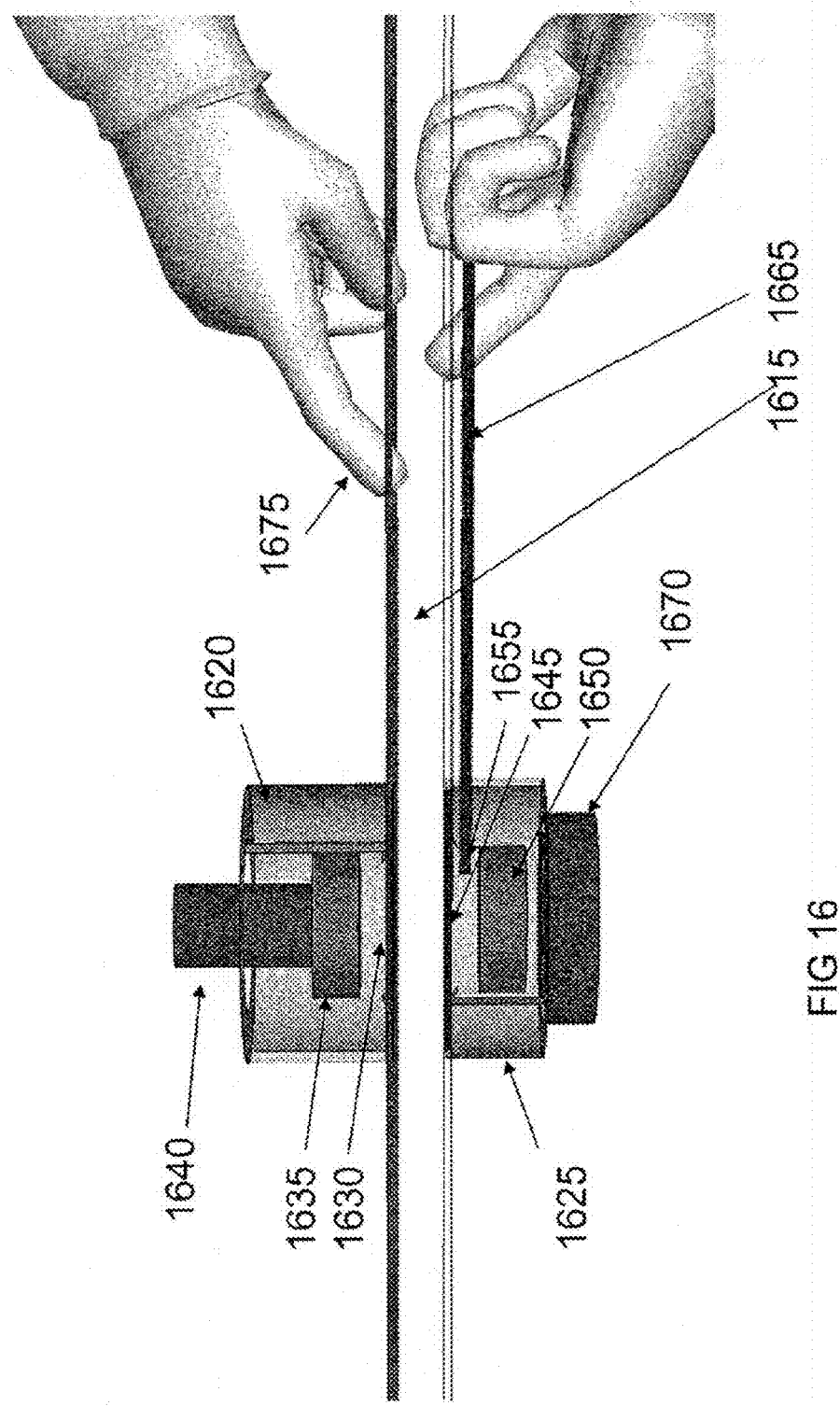
Figure 17:
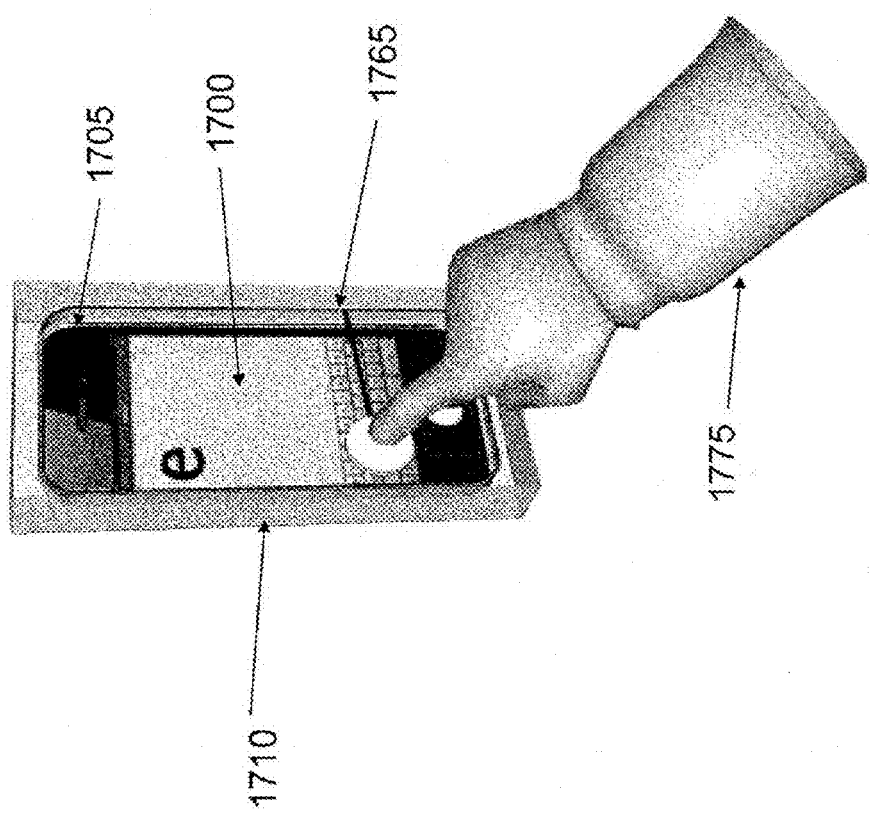

Attention is turned to FIG. 16 which shows a black-and-white photograph of an embodiment of the instant invention. The photograph was included as it shows details of a development version of the instant embodiment that works as described. Housings 1620 & 1625 were produced from a non-metallic plastic material. Annular stronger magnets 1630 & 1645 were selected and placed at the base of each housing 1620 & 1625 so as to keep them secured to the rigid Plexiglas® cover 1615. A plunger 1640 is shown depressed by user 1675 who holds on to wire 1665 with a finger. Weaker magnet 1650 is shown displaced upwards towards conductive element 1655 due to the depression of plunger 1640 and its associated weaker magnet 1635. The associated conductive polymer stylus 1670 is shown underneath housing 1625. A flexible conductive connector 1660 is placed between the stylus 1670 and the moveable weaker magnet 1650. Attention is turned to FIG. 17 which shows the instant embodiment deployed in activating a touch screen 1700 of an iPhone device. FIG. 17 shows user 1775 activating the letter "e" of the word "screen" on the touch screen 1700 by pressing the plunger of the device which causes the touch screen 1700 of the iPhone 1705. Wire 1765 extends out of the protecting case 1710 and is accessed by user 1775 in this fully enabled embodiment.

It is expected that some embodiments of the instant invention may include one or a plurality of physical buttons that pass through a clear plastic covering so as to allow for user access to an on/off button as well as other cellular phone features through the plastic cover. Such buttons are generally placed in a single, fixed position (unlike the mobile magnets described herewith in the invention), and if used underwater, appropriate O-rings are employed to prevent water from reaching the screen through the holes drilled in the plastic cover. Such buttons work on pressure from user and do not involve magnets as described herewith. An example of a prior art fixed physical button arrangement for underwater photography (only) is the following: http://www.techtalkr.com/tat7-scuba-case-underwater-casing-for-iphone/.

Embodiments of the instant invention may be included in other products such as helmets, clothes, autos, tables, military displays, or other objects. Additionally, embodiments of the invention may include microphone, speaker or other electronic elements placed on a case or the like that integrates therewith an embodiment of the instant invention. Alternatively, the element may cover regions beyond a touch-sensitive screen to provide environmental protection for an entire device.

Some embodiments of the invention may also allow for mechanical activation of physical keys, such as those associated with a QWERTY keyboard or the like.

The protective element may be clear, semi-clear or completely occluded. Additionally, in some embodiments, the protective element may have areas that are clear with other areas occluded.

The protective element in some embodiments may include electrically-conducting materials and/or show electrically conducting properties. In embodiments employing a stylus, the stylus may be replaceable and it may be made of any relevant materials and show any relevant properties to allow for activation of or communication with a touch-screen display.

It is understood that pluralities of magnet pairs may be employed in some embodiments of the invention, and some magnets may be associated with a user, his fingers, and or an associated magnet-impregnated glove.

Some embodiments of the instant invention may also include space to store magnets used in the invention. Magnets associated with the outer side and the inner side of the protective element may be stored together or separately. Some embodiments may include a further protector disposed above the protective element so as to protect the latter from scratches and any other incidental damages.

In some embodiments of the invention, the protective element may include optical or other features to enhance the interaction with the associated touch-screen display. Magnifying capabilities, lenses, or prisms may be employed to aid user in seeing the touch-screen display beneath the protective element. In some embodiments, magnets may be associated with such optical elements such as lenses to aid in the use of said magnets. Fiber optics may be employed to aid in positioning of stylus.

While the instant invention has been described primarily as an "add-on" component for computing devices having touch-sensitive screens and the like, in some embodiments the instant invention may be produced and/or sold with the associated computing element/cellular phone. Legs, spacers, and the like may be employed to keep the protective element at an optimized position relative to an associated screen or display to allow for user-selected activation of the screen.

Some embodiments of the instant invention may allow a user to move the protective element to allow for coverage of some, but not necessarily all regions of a display or the like.

Some embodiments of the instant invention may include holes or other elements to aid in speaking and hearing. Some holes may include options for transient opening and closing.

A single touch-sensitive screen protector may be employed to protect a plurality of displays or alternatively a plurality of screen protectors may be employed to protect a single display.

In some embodiments of the invention, magnets may be attached to cables, fiber optic wires, or the like so as to enhance functionality.

Some embodiments of the instant invention may include a sack or pouch to store the screen protector when not in use.

It is understood that some embodiments of the instant invention may include a plurality of magnet pairs disposed around a protective cover element. Additionally, some embodiments may have magnet pairs in generally fixed positions and not moving over the element surface.

It is expected that during the life of a patent maturing from this application, additional impact-resistant, touch-responsive display cover will be developed, and the scope of the term of the invention is intended to include all such new technologies a priori.

It is understood that the disposition of the magnets as described and shown could easily be reversed to have say three negative and one positive or two negative and two positives relative to the surfaces of the protective element in the invention. Additionally, electromagnets having no polarity may be employed in some embodiments of the instant invention, such electromagnets receiving polarity as a function of a user contacting one or more such magnets.

As used herein the term "about" refers to ±10%.

The terms "comprises", "comprising", "includes", "including", "having" and their conjugates mean "including but not limited to".

The term "consisting of means "including and limited to".

The term "consisting essentially of" means that the, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. The present invention could be employed for a wide variety of embodiments with differentially sized flotation elements as herewith described. The instant invention may be employed in dosing of other medications not directly described herewith.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements. Certain embodiments of the instant invention may include design features that allow for easy finger contact and movement of the magnets/stylus over the surface of the protective element.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed:

1. A device for allowing transmission of a tactile signal through a rigid material to a touch screen, including:
    a rigid, generally flat, optically-clear element;
    a first stronger magnet disposed on an outer side of said element, wherein said first stronger magnet has a positive polarity facing said element;
    a second stronger magnet disposed on a inner side of said element physically opposite said first stronger magnet, wherein said second stronger magnet has a negative polarity facing said element;
    a first weaker magnet disposed on the same side as said first stronger magnet, wherein said first weaker magnet is magnetically weaker than said first stronger magnet and has its positive polarity facing said element;
    a second weaker magnet disposed on the same side as said second stronger magnet, wherein said second weaker magnet is magnetically weaker than said second stronger magnet and has its negative polarity facing towards said element;
    a stylus adapted to be in continuous contact with said touch screen;
    a flexible conductive element disposed between said stylus and said second weaker magnet;
    a plunger adapted to be depressed by a user in the direction of said element, wherein depression of said plunger causes said second weaker magnet to extend said flexible conductive element away from said stylus;
    a first housing adapted to hold said first stronger magnet, said first weaker magnet and said plunger;
    a second housing adapted to hold said second stronger magnet, said second weaker magnet, said stylus, and said flexible contact element;
    a conductive element attached to said second housing; and,
    an electrically conductive wire contacted to said conductive element and adapted to be contacted by a capacitance body.

2. The device according to claim 1, wherein said touch screen is associated with a smartphone, tablet computer, watch computer, camera, handheld computing device, laptop computer or any other touch activated element.

3. The device according to claim 1, wherein said first housing and said second housing are made of non-magnetic material and said first stronger magnet and second stronger magnet are in an annular shape.

4. The device according to claim 1, wherein said stylus is realized as a flexible, conductive material and said flexible contact element is realized as a spring with a predetermined spring constant.

5. The device according to claim 1, wherein said capacitance body is realized as an outer surface of a cellular phone, human body, car body or interior, plane interior, clothing, water, ground, building, floor, computer.

6. The device according to claim 1, wherein said first housing and said second housing are adapted to be placed opposite one another on either side of said optically-clear element, with said first stronger magnet and said second stronger magnet holding each other in place due to opposite polarities facing said optically-clear element.

7. A method for allowing activation of a touch screen through a rigid optically clear element, including the following:
providing an optically-clear, mechanically rigid element whose dimensions are generally similar to those of said touch screen and whose thickness is selected to prevent damage to said touch screen;
providing a first housing;
disposing within said first housing a first stronger magnet, a first weaker magnet, and a plunger;
providing a second housing;
disposing within said second housing a second stronger magnet, a second weaker magnet, a conductive element contacted to a wire, a stylus, and a flexible contact element contacting at first end said second smaller magnet and at a second end said stylus;
placing said first housing on a first side of said rigid element, wherein said first stronger magnet and said first weaker magnet have their negative polarity facing towards from said rigid element;
placing said second housing on a second side of said rigid element, wherein said second stronger magnet and said second weaker magnet have their positive polarity facing towards said rigid element and wherein said first housing and said second housing are generally opposite one another;
placing said rigid element over a touch screen, wherein said second housing rests between said rigid element and said touch screen;
securing said rigid element over said touch screen, wherein said wire is accessible in part to contact by a capacitance body;
allowing contact between said wire and said capacitance body;
allowing said user to depress said plunger, wherein depression of said plunger causes said second weaker magnet to contact said conductive element and allow for conductive continuity between said capacitance body and said stylus contacted to said touch screen to allow for activation of said touch screen at a position where stylus contacts said touch screen; and, allowing said user to move said first non-conductive housing to another position over said rigid element so as to activate a different region of said touch screen.

8. The method according to claim 7, wherein said touch screen is associated with a smartphone, tablet computer, watch computer, handheld computing device, laptop computer or any other touch activated element.

9. The method according to claim 7, wherein said capacitance body is realized as an outer surface of a cellular phone, human body, car body or interior, plane interior, clothing, water, ground, building, floor, computer.

10. The method according to claim 7, wherein said touch screen is realized as a plurality of touch screens.

11. The method according to claim 7, wherein a plurality of first housings and a plurality of second housings are provided on both sides of said rigid element.

12. The method according to claim 7, wherein said first housing and said second housing have a non-magnetic property.

13. A method for allowing activation of a touch screen through a rigid optically clear element, including the following:
providing an optically-clear, mechanically rigid element whose dimensions are generally similar to those of said touch screen and whose thickness is selected to prevent damage to said touch screen;
providing a first magnet;
providing a second magnet;
providing a conductive stylus contacted to said second magnet;
providing a conductive wire in conductive contact with said stylus;
placing said first magnet on a first side of said rigid element, wherein said first magnet has a negative polarity facing towards from said rigid element;
placing said second magnet on a second side of said rigid element, wherein said second magnet has a positive polarity facing towards said rigid element and wherein said first magnet and said second magnet are generally opposite one another;
placing said rigid element over a touch screen, wherein said second magnet, said conductive element and said stylus rest between said rigid element and said touch screen;
securing said rigid element over said touch screen, wherein said wire is accessible in part to contact by a capacitance body;
placing said wire in a position where it may be physically contacted by a user;
allowing said user to move said first magnet over said rigid element;
allowing said user to contact said wire when said user wishes to activate a first location on the touch screen under said stylus;
allowing user to move said first magnet; and, allowing user to again contact said wire when said user wishes to again activate a second location on said touch screen, wherein said second location is under said stylus.

14. The method according to claim 13, further including the step of placing a lubricant between said first magnet and said rigid element and between said second magnet and said rigid element.

15. The device according to claim 13, wherein said optically-clear element is realized as a screen protector of a hardened cellular phone case.

16. The device according to claim 13, wherein said user contact to said wire is performed by an element activated by user contact at a predetermined location.

* * * * *